Patented Oct. 5, 1943

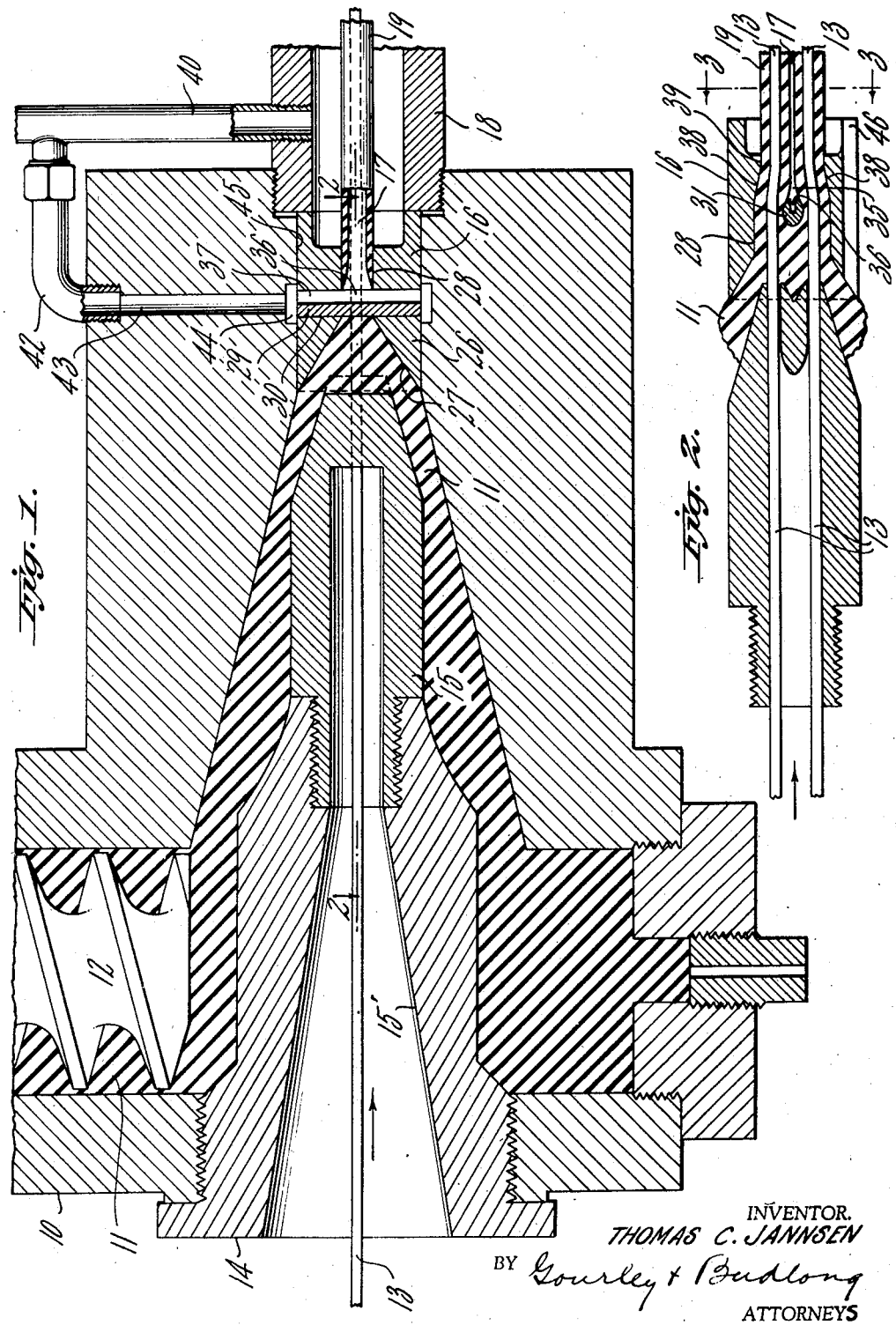

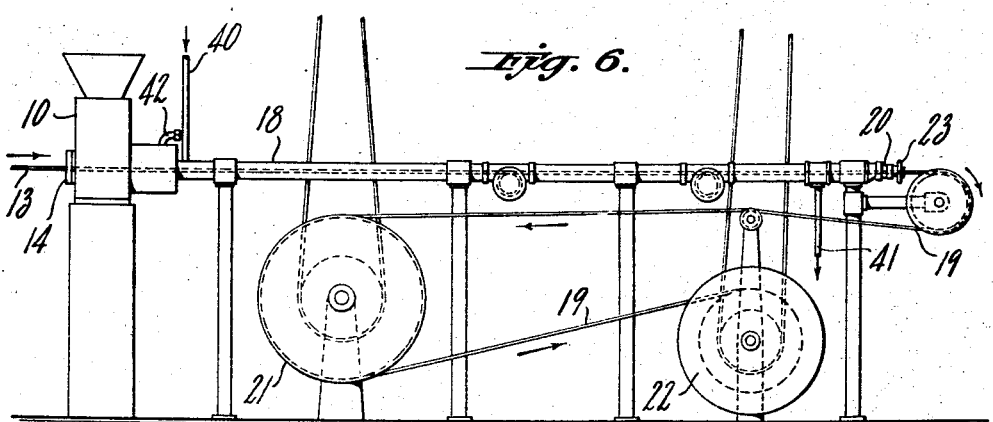

2,331,195

UNITED STATES PATENT OFFICE 2,331,195

EXTRUSION METHOD AND APPARATUS

Thomas C. Jannsen, Bristol, R. I., assignor to United States Rubber Company, New York, N. Y., a corporation of New Jersey Application February 18, 1939, Serial No. 257,115

11 Claims. (Cl. 18—13)

This invention relates to an improved method and apparatus for manufacturing longitudinal strips of rubber composition having a longitudinal gas passage therein. The invention relates particularly to an improved method and apparatus for manufacturing electric conductor cable having an insulated rubber composition cover enclosing at least two conductors and provided with a gas separator passage between the conductors.

Heretofore rubber compositions have been extruded in the form of tubing and in the form of insulating covering around two or more conductors with a gas separator passage formed in the insulation between the conductors. The articles so formed have been cut and coiled in limited lengths and vulcanized in a heated gas under pressure, usually steam. In order to prevent the pressure of the vulcanizing gas from collapsing the passage in the rubber composition and deforming or causing the walls of the passage to adhere together, the gas was permitted to enter the passage from the open cut ends of the articles and equalize the pressure on the inside and outside of the passage. In such process it was necessary to extrude the rubber in one operation and vulcanize it in another operation. This resulted in handling the articles twice and added to the cost of manufacture.

Although, articles have been made as above described, some difficulty has been encountered in preventing the walls of relatively thin and/or small passages from being deformed or collapsing and adhering together during the extruding and vulcanizing process due to the difference between the greater external pressure on the plastic in the extruding die passage and in the vulcanizing chamber and the lesser internal pressure in the passage formed in the plastic. The adherence of the walls of relatively large diameter passages has been prevented by injecting soapstone or like solid or liquid adhesion preventing materials therein during the extruding operation, but unless the passages are substantially filled, which is undesirable, this does not prevent the relatively thin walls of passages from being deformed by external pressure and from being given an undesirable shape after vulcanization. The adherence of the walls of a relatively small passage cannot successfully be prevented by injecting solid or liquid adhesion preventing materials into it, because the materials either fill the passages or clog the nozzle of the passage forming core, through which they are injected.

In accordance with the present invention, a strip of plastic rubber composition having a longitudinal internal passage formed therein is extruded from the head of an extruding machine directly into a vulcanizing chamber containing gas under pressure, preferably dry steam. The longitudinal passage in the strip of rubber composition is formed in the extruding head and as it is formed, gas under pressure is injected into the passage at a pressure substantially equal to that in the extruding head at the point of injection and in the vulcanizing chamber. The internal pressure of the gas equalizes the external pressure of the gas in the vulcanizing chamber and prevents the strip from being deformed and/or the walls of the passage from collapsing and being caused to adhere together. Preferably the gas injected into the passage in the rubber composition is heated to the vulcanizing temperature of the rubber so as to at least partially vulcanize the walls of the passage in order to reduce the tackiness of their surfaces and thereby reduce the liability of the walls adhering together in the event the pressure within the passage is reduced. Dry steam is preferable to other heated dry gases because it has a greater tendency to reduce the tackiness of the walls of the passage and has very little tendency to oxidize the rubber. It is advantageous to inject dry steam into the passage in the rubber composition since it can be taken from the source supplied to the vulcanizing chamber and the pressure of this steam at about 225 pounds is suitable.

In the preferred form of this invention a tacky plastic rubber composition is extruded around and between one or more electrical conductors and a gas separator passage is formed in the insulation between the conductors during the extruding operation. The rubber covered conductors having the gas separator passage formed therebetween is discharged from the head of the extruding machine into a continuous vulcanizing tube or chamber, and vulcanized as previously described. The insulated conductors are passed through a seal at the opposite end of the vulcanizing tube, which permits the passage of the conductors and prevents the escape of the vulcanizing gas, except to a limited extent, which may be controlled by the adjustment of the seal. The conductors are drawn through the vulcanizing tube and seal by means of a capstan and then wound on a reel in the usual manner. The rate at which the insulated conductors are drawn through the vulcanizing tube and the temperature of the vulcanizing gas and the compounding of rubber is so controlled that the insulating rubber composition is vulcanized before it passes through the seal.

This invention will be more clearly understood by referring to the following description and the accompanying drawings in which:

Fig. 1 is a cross section of an extruding head, illustrating an apparatus suitable for manufacturing insulated electric conductors, and embodying this invention;

Fig. 2 is a cross section on line 2—2 of Fig. 1, of the conductor guide and the die for forming the insulating rubber composition around the conductors and for forming the internal passage therebetween;

Fig. 3 is a full end view of the die shown in Fig. 2 and taken on line 3—3, looking in the direction of the arrows as it would appear without the conductors and extruded material therein.

Fig. 4 is a detailed view of the nozzle pin used in the die for forming the passage in the rubber composition;

Fig. 5 is a side view of the pin shown in Fig. 4;

Fig. 6 is an elevational view of the complete assembly of the apparatus including the extruding head, vulcanizing tube, and the mechanism for drawing the insulated conductors therethrough;

Fig. 7 is an isometric view of a twin conductor insulated electrical cable produced by the mechanism shown in Figs. 1–6; and Fig. 8 is a cross section of a modified form of an extruding die which may be substituted for the die shown in Figs. 1 to 5.

This invention is illustrated and described, in reference to an apparatus and method for manufacturing twin conductor insulated electrical cable having a gas separator passage formed between the conductors. However, this invention may be used in making other forms of extruded strips of vulcanized rubber compositions having a longitudinal passage formed therein during the extruding operation, as will be understood from the following description.

As shown in Fig. 1 the apparatus comprises an extruding head 10 through which a plastic rubber composition 11 is extruded by means of a screw 12 around and between a pair of conductors 13, which are fed in order through the rear end 14 of the head, a guide holder 15', guide 15, and then through a die 16 which shapes the plastic around the conductors and forms the gas separator passage 17 therebetween. The insulated conductors are discharged from the die into a vulcanizing tube 18 containing a vulcanizing medium, preferably steam under pressure.

The insulation is vulcanized around the conductors as it passes through the tube 18 and the insulated electrical cable 19 so formed, is drawn through a seal 20 (Fig. 6) at the discharge end of the tube by a capstan 21. The conductors are passed around the capstan and then wound upon a reel 22 in the usual manner. The seal 20 may be constructed, as shown in detail in United States Patent No. 1,689,205, so as to permit the electrical cable 19 to pass therethrough without any substantial escape of the vulcanizing steam. It is desirable that some steam escape in order to lubricate the insulation as it passes through the seal. The quantity of steam permitted to escape may be controlled by an adjusting wheel 23. The rate at which the electrical cable is drawn through the vulcanizing tube 18, and the temperature of the vulcanizing steam therein, and the compounding of the rubber is so controlled that the rubber composition is vulcanized before it passes through the seal 20.

One form of the electrical cable so manufactured is shown in Fig. 7. The cable 19 comprises a pair of conductors 13 having a vulcanized covering of insulated rubber compound 24 encasing the conductors and provided with a gas separator passage 17 interposed between the conductors. In this construction the conductors 13 are effectively insulated by a unitary body of rubber composition which can be divided by tearing the insulation in a plane passing through the gas separator passage 17 and perpendicular to lines passing through the conductors so as to form a separate and complete insulating jacket 24a and 24b for each conductor 13. The cable 19 as shown in Fig. 7, has an oval cross section, and in some instances the cable is made of such a size that the long axis of the section is about one-quarter of an inch and the transverse short axis is about one-eighth of an inch, and the width of the internal passage 17 is about .016" and the long dimension of the passage transverse thereto is about .05". In such a construction the walls of the passage at its thinnest point are .025" in thickness. The above dimensions of the passage and thicknesses of its walls are given to indicate generally the size of passage and the thickness of its walls that may be made in accordance with this invention. It will be understood, however, that the invention is not limited to making passages having such dimensions or walls of such thickness and that passages of various sizes and shapes may be made.

One form of the die for making the insulated electrical cable is shown in detail in Figs. 1 to 5. The body 26 of die 16 is provided with a converging throat 27 for receiving the plastic rubber composition 11 and the conductors 13 to be insulated. The throat terminates in a die passage 28 which shapes the plastic rubber composition 11 around the conductors 13.

The internal walls of the passage 17 in the cable 19 are formed by a pin 29 extending across the die passage 26 and secured in a bore 30 in the die body 26. That portion of the pin 29 which extends across the die passage 28 constitutes a separator and a nozzle 31 for dividing the plastic 11 between the conductors 13 and for injecting gas under pressure between the divided walls of the plastic as shown in Fig. 2. The separator 31 has an elongated cross sectional shape and is so arranged in the die passage 28 that its long axis extends parallel thereto.

The nozzle and separator pin 29 is shown in detail in Figs. 4 and 5. The separator portion 31 is reduced adjacent to the walls of the die passage 28 by grooves 32 extending parallel to the axis of the die passage 28 and on opposite sides of the pin 29. As the plastic 11 is extruded by the separator 31 the relatively thick central portion 33 separates the plastic in contact therewith a greater distance than the thin end portions 34 opposite the grooves 32 and causes the separated walls to be grooved and a void or space 35 (Fig. 2) to be formed in the plastic on the side of the separator 31 facing the direction of flow.

Referring to Figs. 1, 2 and 3, gas is injected under pressure into the void or space 35 in the plastic from a nozzle orifice 36 formed in the separator or nozzle 31 of the nozzle pin 29. The gas is conducted to the orifice 36 through a longitudinal groove or slot 37 in the pin 29, and that portion of the groove extending between the walls of the die passage 28 forms the orifice 36.

The die passage 28 extending beyond the nozzle 31 is provided with converging side walls 38 (Fig. 2) on opposite sides of the nozzle 31, and as the plastic covered conductors 13 travel between these converging walls, the portions of the plastic separated by the thin portions 34 of the separator are brought together and caused to be united by the pressure of the walls 38. The central grooved portions of the divided walls of plastic are prevented from uniting by the internal pressure of the gas injected thereinto through the nozzle 36. The final external shape of the insulation around the conductors 13 is provided by the walls 39 extending substantially parallel to the axis of the die passage 28. The longitudinal passage 17 is thus formed in the insulated cable 19, and the walls of this passage are prevented from being deformed and/or adhered together by the external pressure exerted thereon in the die passage 28 and in the vulcanizing tube 18, as these pressures are equalized by the pressure of the gas injected into the passage 17 of the cable 19.

In order to prevent the nozzle 36 from being closed by the plastic material 11 being forced thereinto by the extruding pressure, the length and size of the die passage 28 beyond the nozzle is so proportioned as to reduce the tendency of the plastic material to back up, and the conductors 13 are drawn through the passage at such a speed by the capstan as to also reduce the back pressure of the plastic at the nozzle orifice 36.

Dry steam is preferably used for vulcanizing the insulating rubber composition covering 24 and for injection into the internal passage 17 therein. As shown in Figs. 1 and 6, the steam is delivered to the vulcanizing tube 18 through a pipe 40, and the steam is discharged from the opposite end of the vulcanizing tube 18 through an outlet pipe 41. The steam is led from the pipe 40 through the pipe 42 which is connected to a passage 43 in the extruding head 10. A groove 44 is formed in the internal bore 45 of the extruding head 10 into which the die 16 is inserted. The steam is delivered from the groove 44 to the groove 37 in the nozzle pin 29 and is discharged through the nozzle 36 between the separated walls of the plastic which is being extruded through the die passage 28. The steam so injected assists in vulcanizing the internal surfaces of the passage 17 formed in the cable 19 and reduces the tendency of the walls thereof to adhere together in the event they should come in contact.

The extruding die 16 above described is retained in the bore 45 of the head 10 by the end of the vulcanizing tube 17 which is screwed into the head against the die 16, and the die is prevented from turning in the bore 45 by a land in the bore over which the groove 46 (Fig. 3) in the die slides. The form of die 16 above described is preferred as it facilitates the construction of very small injector nozzles, whereby small passages in plastics may be formed.

Another form of extruding die 47 is shown in Fig. 8. It may be used in the extruding head 10 by substituting it for die 16 shown in Fig. 1. Except in reference to the construction of the nozzle 48, this die is the same as that shown in Fig. 1. As shown in Fig. 8, the die 47, is provided with a body 49 having a die passage 50 and an inlet throat 51 at its rear end. The nozzle 48 is made in the form of an L. The upper end of the L-shaped nozzle is secured in the body 49 by a plug 52, which seals the enlargement of the aperture through which the lower end 53 of the nozzle is inserted into the passage 50. Gas under pressure is admitted through the passage 54 in the nozzle 48 to the die passage 50. A nozzle of this type has the advantage of injecting the gas into the longitudinal passage that may be formed in the body of the plastic rubber composition at a point after the outer margins of the separated walls of the plastic have been closed around the upper portion of the nozzle. This prevents the injected gas from coming in contact with the outer margins of the walls of plastic to be united and a stronger union may be formed between such previously separated walls. This is particularly desirable in the manufacture of articles, such as rubber tubing, where strong walls are desired.

While certain forms of this invention have been illustrated herein it will be understood that the details thereof may be changed or modified without departing from the spirit of the invention and the scope of the appended claims.

Having thus described my invention, what I claim and desire to protect by Letters Patent is:

1. The method of making a longitudinal passage in an extruded body of rubber composition comprising the steps of extruding a stream of plastic rubber composition under pressure through a die passage and around a nozzle, discharging gas from said nozzle into the rubber composition under pressure higher than atmospheric pressure and substantially equal to the extruding pressure at the nozzle, entrapping the gas ahead of the nozzle in the interior of the plastic to form a passage therein, discharging the rubber composition from the die passage directly into and passing it through a chamber of heated gas under sufficient pressure to substantially balance the pressure of the gas injected into the passage in the rubber composition, and thereby cause the extruded rubber composition to retain its shape while being vulcanized.

2. The method of making a longitudinal passage in an extruded body of rubber composition, comprising the steps of extruding a stream of plastic rubber composition under pressure through a die passage, forming a channel in said stream, injecting gas into the channel under pressure higher than atmospheric pressure and substantially equal to the extruding pressure at the place of injection, uniting the walls of the channel at the outer surface of the plastic, and entrapping the gas in the interior of the plastic to form a passage therein, discharging the rubber composition from the die passage directly into and passing it through a chamber of heated gas under pressure substantially equal to the pressure in the passage in the rubber composition, and thereby vulcanize the rubber composition.

3. The method of making a longitudinal passage in an extruded body of rubber composition, comprising the steps of extruding a stream of plastic rubber composition under pressure through a die passage, forming a channel in the stream having an opening extending into the surface thereof which has a transverse cross sectional dimension less than other internal parallel dimensions of the channel, injecting into the channel gas under pressure higher than atmospheric pressure and substantially equal to the extruding pressure at the place of injection, uniting the walls of the channel at the outer surface of the plastic and entrapping the gas in the interior of the plastic to form a passage therein, vulcanizing the rubber composition under pressure substantially equal to the pressure in the plastic.

4. The method of making a longitudinal passage in an extruded body of rubber composition, comprising the steps of extruding a stream of plastic rubber composition under pressure through a die passage, forming a channel in the stream having an opening extending into the surface thereof which has a transverse cross sectional dimension less than other internal parallel dimensions of the channel, partially curing the walls of the channel by injecting into the channel hot gas under pressure higher than atmospheric pressure and substantially equal to the extruding pressure, uniting the walls of the channel at the outer surface of the plastic and entrapping the gas therein to form a passage, discharging the rubber composition from the die passage directly into and passing it through a chamber of heated gas under pressure substantially equal to the pressure of the gas injected into the passage in the rubber composition and thereby vulcanize the rubber composition.

5. The method of making insulated electric conductor cable, comprising drawing at least two spaced conductors through a die passage, extruding plastic rubber composition under pressure around the conductors, forming a channel in the plastic between the conductors, injecting gas into the channel in the die passage and under pressure higher than atmospheric pressure and substantially equal to the extruding pressure at the place of injection, uniting the walls of the channel at the outer surface of the plastic by the pressure of the walls of the die passage, and entrapping the gas in the interior of the plastic to form a passage therein between the conductors, passing the conductors with the rubber composition extruded therearound directly into and through a chamber of heated gas under sufficient pressure to substantially balance the pressure of the gas injected into the passage in the rubber composition, and thereby cause the extruded rubber composition to retain its shape while being vulcanized.

6. The method of making insulated electric conductor cable, comprising drawing at least two conductors through a die passage, extruding plastic rubber composition under pressure around the conductors, forming a channel in the plastic between the conductors which is wider in the interior of the plastic than at the surface, injecting steam into the channel in the die passage and under pressure higher than atmospheric pressure and substantially equal to the extruding pressure at the place of injection, uniting the walls of the channel at the outer surface of the plastic and entrapping the steam in the interior of the plastic to form a passage therein, passing the conductors with the plastic rubber covering thereon directly into and through a vulcanizing chamber containing steam under pressure substantially equal to the pressure of the steam injected into the passage in the rubber composition, and thereby vulcanize the rubber composition.

7. The method of making insulated electric conductor cable, comprising the step of drawing at least two conductors through a die passage, extruding plastic rubber composition under pressure around the conductors, dividing the plastic rubber between the conductors into separate parts so as to form grooves in the adjacent walls of the parts, injecting steam between the grooved adjacent walls in the die passage and under pressure higher than atmospheric pressure and substantially equal to the extruding pressure at the place of injection, uniting the grooved walls at the outer surface of the plastic and entrapping the steam in the interior of the plastic to form a passage therein, passing the conductors with the plastic rubber covering thereon directly into a vulcanizing chamber containing steam under sufficient pressure to substantially balance the pressure of the steam injected into the passage in the rubber composition and thereby cause the extruded rubber composition to retain its shape while being vulcanized.

8. An apparatus for making an extruded body of rubber composition provided with a longitudinal passage therein, said apparatus comprising the combination of a die having a die passage provided with a nozzle therein, means for extruding plastic rubber through said die passage and around said nozzle, a continuous vulcanizing tube attached to the end of said die passage, means for supplying a source of heated gas to said continuous vulcanizing tube, and means for supplying heated gas to said nozzle in said die passage and at substantially the pressure in said tube.

9. An extruding die for forming longitudinal extruded bodies having a longitudinal passage therein, said die comprising a body having a forming passage therein, a bore extending transversely through the wall of said forming passage, a rod having a longitudinal slot formed therein, said rod being secured in said bore and extending into said forming passage with the slot facing the discharge end of the die, and the thickness of said rod on a cross section taken transversely of the axis of said forming passage and axially of said rod being less adjacent to the inner end of said bore than at the center of said passage.

10. An extruding die for forming longitudinal extruded bodies having a longitudinal passage therein, said die comprising a body having a forming passage therein, a bore extending transversely through the wall of said forming passage, a rod having a longitudinal slot formed therein, said rod being secured in said bore and extending entirely across said passage with the slot facing the discharge end of the die, and said rod having grooves formed on opposite sides of said rod adjacent to and extending axially of the walls of said forming passage.

11. An extruding die for forming longitudinal extruded bodies having a longitudinal passage therein, said die comprising a body having a forming passage therein, a bore extending transversely through the wall of said forming passage, a rod having a longitudinal slot formed therein, said rod being secured in said bore and extending entirely across said passage with the slot facing the discharge end of the die, said rod having grooves formed on opposite sides of said rod adjacent to and extending axially of the walls of said forming passage, and the sides of said forming passage on each side of said slot extending from said slot towards the discharge end of said die passage being convergent.

THOMAS C. JANNSEN.